(12) United States Patent
Oguma (10) Patent No.: US 7,302,559 B2
(45) Date of Patent: Nov. 27, 2007

(54) MEMORY DUMP PROGRAM BOOT METHOD AND MECHANISM, AND COMPUTER-READABLE STORAGE MEDIUM

(75) Inventor: Yukio Oguma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 341 days.

(21) Appl. No.: 11/118,333

(22) Filed: May 2, 2005

(65) Prior Publication Data

US 2006/0168439 A1 Jul. 27, 2006

(30) Foreign Application Priority Data

Jan. 26, 2005 (JP) .............. 2005-018287

(51) Int. Cl.
*G06F 11/00* (2006.01)

(52) U.S. Cl. .................... 713/1; 713/2; 714/13; 714/14; 714/15; 714/16; 714/17; 714/24; 714/37; 714/48; 714/55

(58) Field of Classification Search .............. 713/1, 713/2; 714/13–17, 24, 37, 48, 55
See application file for complete search history.

(56) References Cited

U.S. PATENT DOCUMENTS

| | | | | |
|---|---|---|---|---|
| 5,875,484 | A * | 2/1999 | Neuhard et al. ............ | 711/167 |
| 6,643,802 | B1 * | 11/2003 | Frost et al. ................. | 714/37 |
| 6,697,972 | B1 * | 2/2004 | Oshima et al. .............. | 714/55 |
| 6,718,482 | B2 * | 4/2004 | Sato et al. ................... | 714/4 |
| 6,779,132 | B2 * | 8/2004 | Andress et al. ............. | 714/24 |
| 7,134,054 | B2 * | 11/2006 | Oshima et al. .............. | 714/55 |
| 7,240,240 | B2 * | 7/2007 | Balakrishnan et al. ..... | 714/15 |
| 2004/0258750 | A1 | 12/2004 | Oguma | |
| 2005/0240806 | A1 * | 10/2005 | Bruckert et al. ............ | 714/6 |
| 2006/0143534 | A1 * | 6/2006 | Dall ........................... | 714/38 |

FOREIGN PATENT DOCUMENTS

| | | |
|---|---|---|
| JP | 8-95834 | 4/1996 |
| JP | 2001290678 | * 10/2001 |
| JP | 2003-303161 | 10/2003 |
| JP | 2004-258750 | 9/2004 |

OTHER PUBLICATIONS

11/023,184, Dec. 28, 2004, Yukio Oguma, Fujitsu Limited Kawaski, Japan.

* cited by examiner

*Primary Examiner*—A. Elamin
(74) *Attorney, Agent, or Firm*—Staas & Halsey LLP

(57) ABSTRACT

A memory dump program boot method includes the steps of defining, in non-volatile variables that are managed by a boot firmware of a computer system, boot information of a plurality of stand-alone dump programs that are installed in the computer system, and a table variable indicating a corresponding relationship of the plurality of stand-alone dump programs and a plurality of operating systems, specifying the boot information of a corresponding one of the plurality of stand-alone dump programs from the table variables when the boot firmware boots an arbitrary one of the plurality of operating systems, and writing information indicating the specified boot information in the non-volatile variables that are referred to when executing a stand-alone dump, and booting the corresponding one of the plurality of stand-alone dump programs when a booting of the stand-alone dump is instructed, by checking existence of variables that are referred to when executing the stand-alone dump and referring to information of the variables if the variables exist.

18 Claims, 6 Drawing Sheets

MEMORY DUMP PROGRAM BOOT METHOD AND MECHANISM, AND COMPUTER-READABLE STORAGE MEDIUM

BACKGROUND OF THE INVENTION

1. Field of the Invention

The present invention generally relates to memory dump program boot methods and mechanisms and computer-readable storage media, and more particularly to a memory dump program boot method and a memory dump program boot mechanism for carrying out a boot process with respect to a stand-alone dump program in a computer system that makes a memory dump by the stand-alone dump program, and to a computer-readable storage medium which stores a program for causing a computer to carry out such a boot process with respect to the stand-alone dump program.

Generally, a computer system supports a plurality of boot apparatuses. By setting device path information of the boot apparatus, one apparatus to be actually booted is selected and booted, of a plurality of bootable apparatuses. The kind of operating systems (OSs) installed in the plurality of boot apparatuses may be the same or may be different. In addition, even if the kind of OSs are the same, versions of the OSs may be different. When a fault is generated during operation of a certain OS in such a computer system, a memory dump is made by booting a stand-alone dump program. But depending on the kind of OS to be operated, the stand-alone dump program to be booted should be selectable. Furthermore, it is desirable that the booting of the stand-alone dump program is triggered by the fault generated in the OS only when the fault is generated.

The present invention relates to a boot process which enables registration of a plurality of stand-alone dump programs and selects and boots an optimum one of the plurality of stand-alone dump programs when a fault is generated in such a computer system.

2. Description of the Related Art

If some kind of a system abnormality is generated during operation of the computer system and it becomes difficult to continue the work, it is necessary to immediately restart the computer system so as to enable the work to be continued. In such a case, in order to make it possible to later check the cause of the generated fault, data within a memory of the computer system at the time when the system abnormality is generated are often saved as dump data. The process of making the dump data may be carried out according to a first method or a second method. The first method embeds a memory dump program within the operating OS, and carries out the memory dump by shifting the control to the memory dump program if the fault is generated during operation of the OS. On the other hand, the second method resets the computer system in a state where the memory data is held in the computer system if the fault is generated during operation of the OS, and boots a stand-alone dump program different from the operating OS so as to dump the held memory data. Some computer systems support the process that employs only one of the first and second methods, while other computer systems support the process that employs both the first and second methods.

For example, a Japanese Laid-Open Patent Application No. 8-95834 proposes a memory dump method that is employed when an abnormal end of a computer system occurs.

When making out the memory dump by the stand-alone dump program, the following problems are generated in a case where the computer system supports a plurality of OSs.

In other words, in the case of a computer system such as a large-scale server system, it is not rare that the size of a main memory that is mounted exceeds 256 GB, for example. In such a computer system, it is not realistic to dump all of the main memory for the fault analysis. Accordingly, when making the memory dump, a dump target region is generally limited to a specific region that is required for the fault analysis of kernel data or the like. Of course, the specific region that is required for the fault analysis of the kernel data or the like becomes a different region for different kinds of OSs. But even in the case of the OSs of the same kind, the specific region may become a different region for different versions of the same kind of OS. For this reason, in general, a different stand-alone dump program is required depending on the kind of OS, and further, even in the case of the OSs of same kind, a different stand-alone dump program may be required depending on the version of the OS if the versions of the OSs of the same kind are different. In addition, in some cases, the OS may not support a memory dump by the stand-alone dump program. Hence, in the boot process with respect to the stand-alone dump program, a function is required to select and boot the stand-alone dump program corresponding to the OS that was operating immediately before the fault was generated, of the plurality of existing stand-alone dump programs.

If the computer system permits only one OS to be booted, only one stand-alone dump program needs to be booted. But if the computer system permits a plurality of OSs can be booted and a different OS can be operated by selecting the OS at the time of the booting, there was a problem in that an appropriate memory dump will not be made unless the stand-alone dump program corresponding to the OS that was operating at the time when the fault was generated is booted.

SUMMARY OF THE INVENTION

Accordingly, it is a general object of the present invention to provide a novel and useful memory dump program boot method and mechanism and computer-readable storage medium, in which the problems described above are suppressed.

Another and more specific object of the present invention is to provide a memory dump program boot method, a memory dump program boot mechanism and a computer-readable storage medium, that are applicable to a computer system in which a plurality of OSs can be booted and the OSs can be switched and operated by selecting a booting target apparatus automatically or manually from a plurality of booting target apparatuses when booting the OSs, and a stand-alone dump program which resets and starts the computer system when a fault is generated during the operation of the OS can be set to support an optimum memory dump for the OS that was operating immediately before the fault was generated.

Still another object of the present invention is to provide a memory dump program boot method comprising (a) defining, in non-volatile variables that are managed by a boot firmware of a computer system, boot information of a plurality of stand-alone dump programs that are installed in the computer system, and a table variable indicating a corresponding relationship of the plurality of stand-alone dump programs and a plurality of operating systems; (b) specifying the boot information of a corresponding one of the plurality of stand-alone dump programs from the table variables when the boot firmware boots an arbitrary one of the plurality of operating systems, and writing information indicating the specified boot information in the non-volatile variables that are referred to when executing a stand-alone dump; and (c) booting the corresponding one of the plurality of stand-alone dump programs when a booting of the stand-alone dump is instructed, by checking existence of variables that are referred to when executing the stand-alone dump and referring to information of the variables if the variables exist. According to the present invention, it is possible to realize a memory dump program boot method that is applicable to a computer system in which a plurality of OSs can be booted and the OSs can be switched and operated by selecting a booting target apparatus automatically or manually from a plurality of booting target apparatuses when booting the OSs, and a stand-alone dump program which resets and starts the computer system when a fault is generated during the operation of the OS can be set to support an optimum memory dump for the OS that was operating immediately before the fault was generated.

A further object of the present invention is to provide a memory dump program boot apparatus comprising a non-volatile memory configured to store, in non-volatile variables that are managed by a boot firmware of a computer system, boot information of a plurality of stand-alone dump programs that are installed in the computer system, and a table variable indicating a corresponding relationship of the plurality of stand-alone dump programs and a plurality of operating systems; a write part configured to specify the boot information of a corresponding one of the plurality of stand-alone dump programs from the table variables when the boot firmware boots an arbitrary one of the plurality of operating systems, and to write information indicating the specified boot information in the non-volatile variables that are referred to when executing a stand-alone dump; and a boot part configured to boot the corresponding one of the plurality of stand-alone dump programs when a booting of the stand-alone dump is instructed, by checking existence of variables that are referred to when executing the stand-alone dump and referring to information of the variables if the variables exist. According to the present invention, it is possible to realize a memory dump program boot apparatus that is applicable to a computer system in which a plurality of OSs can be booted and the OSs can be switched and operated by selecting a booting target apparatus automatically or manually from a plurality of booting target apparatuses when booting the OSs, and a stand-alone dump program which resets and starts the computer system when a fault is generated during the operation of the OS can be set to support an optimum memory dump for the OS that was operating immediately before the fault was generated.

Another object of the present invention is to provide a computer-readable storage medium which stores a program for causing a computer of a computer system to boot a memory dump program, the program comprising a procedure causing the computer to define, in non-volatile variables that are managed by a boot firmware of a computer system, boot information of a plurality of stand-alone dump programs that are installed in the computer system, and a table variable indicating a corresponding relationship of the plurality of stand-alone dump programs and a plurality of operating systems; a procedure causing the computer to specify the boot information of a corresponding one of the plurality of stand-alone dump programs from the table variables when the boot firmware boots an arbitrary one of the plurality of operating systems, and to write information indicating the specified boot information in the non-volatile variables that are referred to when executing a stand-alone dump; and a procedure causing the computer to boot the corresponding one of the plurality of stand-alone dump programs when a booting of the stand-alone dump is instructed, by checking existence of variables that are referred to when executing the stand-alone dump and referring to information of the variables if the variables exist. According to the present invention, it is possible to realize a computer-readable storage medium that is applicable to a computer system in which a plurality of OSs can be booted and the OSs can be switched and operated by selecting a booting target apparatus automatically or manually from a plurality of booting target apparatuses when booting the OSs, and a stand-alone dump program which resets and starts the computer system when a fault is generated during the operation of the OS can be set to support an optimum memory dump for the OS that was operating immediately before the fault was generated.

Other objects and further features of the present invention will be apparent from the following detailed description when read in conjunction with the accompanying drawings.

DESCRIPTION OF THE PREFERRED EMBODIMENTS

A description will be given of embodiments of a memory dump program boot method, a memory dump program boot mechanism and a computer-readable storage medium according to the present invention, by referring to the drawings. The computer-readable recording medium of the present invention may be formed by any suitable recording medium which stores a program, and the program may be downloaded to the recording medium from an external apparatus. A magnetic recording medium, an optical recording medium, a magneto-optic recording medium, a semiconductor memory device and the like may be used as the recording medium.

Figure 1:
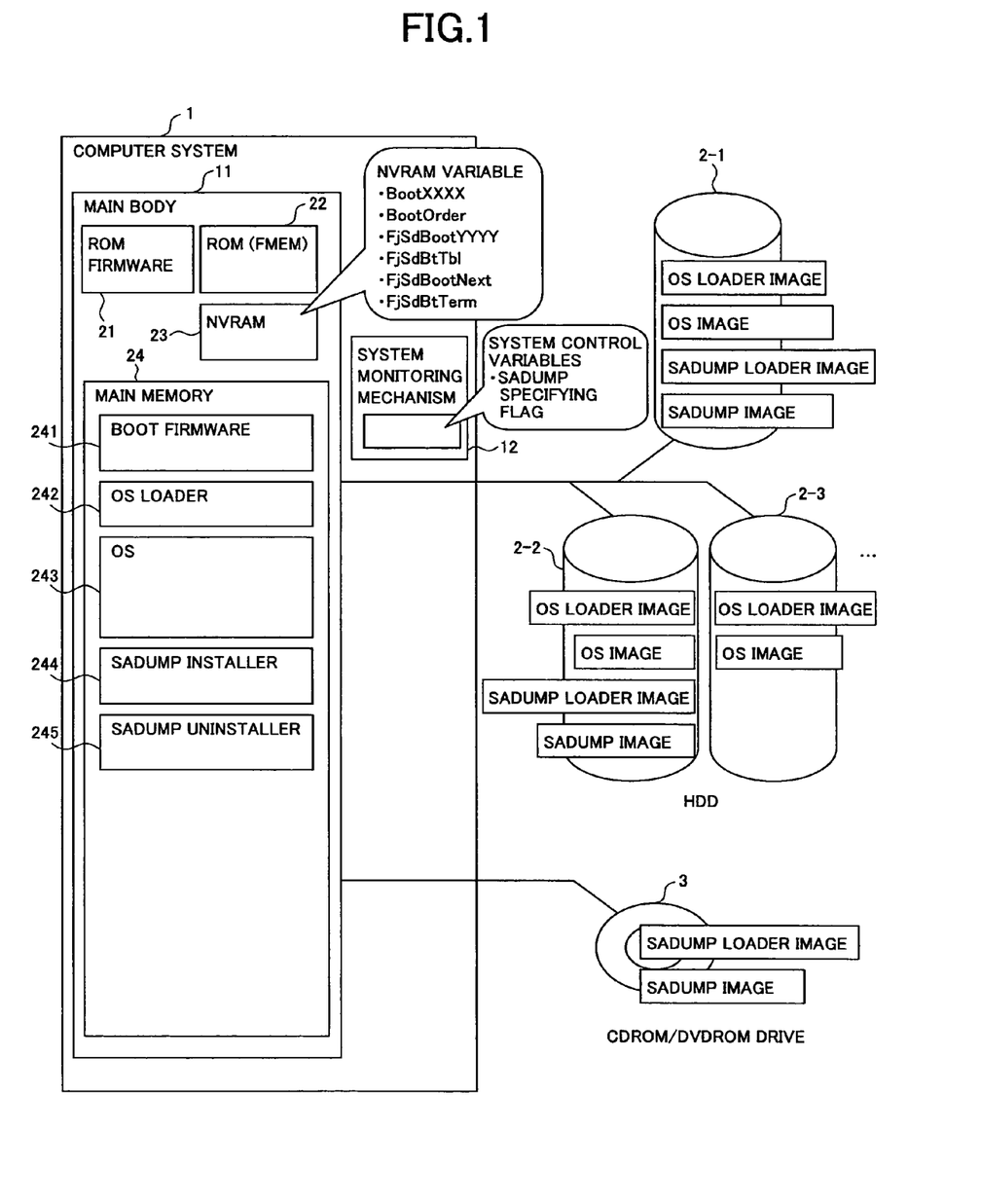
FIG. 1 is a diagram showing a computer system applied with an embodiment of the present invention.

FIG. 1 is a diagram showing a computer system applied with an embodiment of the present invention. A computer system 1 shown in FIG. 1 is made up of a main part 11 and a system monitoring mechanism 12. A plurality of Hard Disk Drives (HDDs) 2-1, 2-2, 2-3, . . . and a CDROM or DVDROM (CDROM/DVDROM) drive 3 are connected to the computer system 1. The main part 11 includes a ROM firmware 21, a Read Only memory (ROM) or a Flash Memory (FMEM) 22, a non-volatile memory 23 such as a Non-Volatile RAM (NVRAM), and a main memory 24. In addition, the main memory 24 includes a boot firmware 241, an Operating System (OS) loader program 242, an OS 243, a Stand-Alone Dump program installer (hereinafter simply referred to as a SADUMP installer) 244, and a Stand-Alone Dump program uninstaller (hereinafter simply referred to as a SADUMP uninstaller) 245. The SADUMP uninstaller 245 may be included within the SADUMP installer 244.

In this embodiment, the ROM firmware 21 is written in a ROM or FMEM, and is booted when the power of the computer system 1 is turned ON, to thereby execute a diagnosis and initializing process with respect to the hardware within the computer system 1. Thereafter, a boot firmware that is compressed and stored in the ROM or FMEM 22 within the computer system 1 is developed into the main memory 24, and the control is transferred to the boot firmware 241. The boot firmware 241 includes a driver program (hereinafter simply referred to as a driver) for controlling booting target apparatuses supported by the computer system 1, and executes a boot process by selecting the booting target apparatus that is to be actually booted, of the booting target apparatuses that are connected to the computer system, according to preset boot information. Normally, the boot firmware 241 boots the OS loader 242 for booting the target OS 243. The boot firmware 241 does not need to be able to interpret a file system of the OS 243. Since the OS loader 242 corresponding to the OS 243 can interpret the file system of the OS 243, the boot firmware 241 is capable of knowing the location of the OS loader 242 within the booting target apparatus, and when the OS loader 242 can be booted, the booting of the OS 243 to be carried out thereafter can be executed by the OS loader 242.

In the computer system 1 shown in FIG. 1, the boot information is stored in the NVRAM 23. According to the boot information stored in the NVRAM 23, the booting target apparatus to be automatically booted when starting the computer system 1 is determined from the plurality of booting target apparatuses connected to the computer system 1. The boot information (or NVRAM variables) stored in the NVRAM 23 includes BootXXXX variables (where XXXX is a hexadecimal value from 0000 to FFFF), and a BootOrder variable. The BootXXXX variables include device path information that indicates the location in the computer system 1 where the booting target apparatus is connected, and information related to a file position and a file name of the OS loader 242. The BootOrder variable indicates an order in which the plurality of existing booting target apparatuses indicated by the BootXXXX variables are to be booted. When the control is transferred to the boot firmware 241, the boot firmware 241 initializing various drivers for booting, and caries out a probing process with respect to the HDDs 2-1, 2-2, 2-3, . . . that are connected to the computer system 1. Thereafter, the value of the XXXX portion of the BootXXXX variable is specified from the BootOrder variable of the NVRAM variables, so as to boot the booting target apparatus that is specified by the BootXXXX variable and the OS loader 242.

Next, a description will be given of important features of this embodiment. In this embodiment, the boot information (or NVRAM variables) stored in the NVRAM 23 within the computer system 1 include the following variables V1) through V4) for booting the SADUMP loader which is a loader program for an SADUMP program (hereinafter simply referred to as an SADUMP), in addition to the BootXXXX variables and the BootOrder variable described above.

V1) FjSdBootYYYY (YYYY is a hexadecimal value from 0000 to FFFF): This variable includes the device path information of the booting target apparatus in which the SADUMP loader is stored, and the file position and the file name of the SADUMP loader.

V2) FjSdBtTbl: This table variable stores information indicating the corresponding relationship of the OS 243 and the SADUMP.

V3) FjSdBootNext: This variable holds the YYYY portion of the FjSdBootYYYY variable which is the boot information of the SADUMP loader that is to be booted next. When a fault is generated during the operation of the OS 243 and a panic, hang or the like of the computer system 1 occurs and the computer system 1 is reset to boot the SADUMP, the FjSdBootYYYY variable according to this FjSdBootNext variable is used as the boot information of the SADUMP loader.

V4) FjSdBtTerm: This variable specifies the process when an error end of the SADUMP occurs. If this FjSdBtTerm variable is "0", an error notification is made and the OS 243 is rebooted. On the other hand, when this FjSdBtTerm variable is other than "0", the SADUMP recorded in the CDROM or DVDROM is booted by regarding the CDROM/DVDROM drive 3 as the booting target apparatus.

Of the HDDs 2-1, 2-2, 2-3, . . . that are connected to the computer system 1, there are some HDDs that store an SADUMP loader image and an SADUMP image, for the stand-alone dump, in addition to an OS loader image and an OS image. The OS loader image refers to an image of a main body of the OS loader 242, and the OS image refers to an image of a main body of the OS 243. Moreover, the SADUMP image refers to an image of a main body of the SADUMP, and is a program that executes a memory dump by being booted by the SADUMP loader. The SADUMP loader image refers to an image of a main body of the SADUMP loader. Since not all OSs 243 support the SADUMP, there are OSs 243 that do not have the corresponding SADUMP loader image and the SADUMP image. The storage locations of the SADUMP loader image and the SADUMP loader may be unrelated to the HDDs 2-1, 2-2, 2-3, . . . that store the OS loader image and the OS image. FIG. 1 shows a case where the SADUMP loader image and the SADUMP image are also stored in the CDROM/DVDROM drive 3, independently of the OS 243. For the sake of convenience, the illustration of a state where the SADUMP loader and the SADUMP image are in the main memory 24 is omitted.

Figure 2:
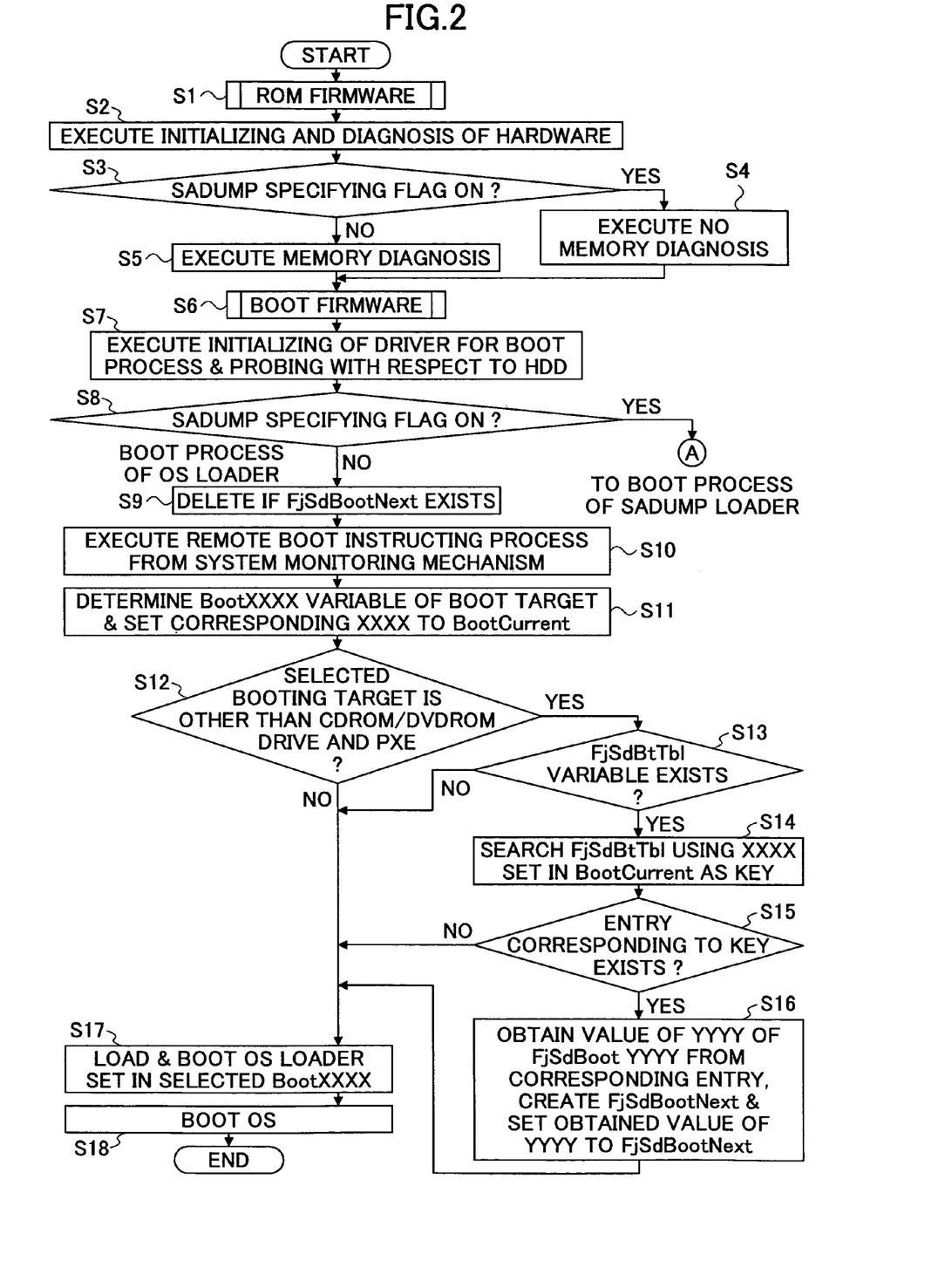
FIG. 2 is a flow chart for explaining processes of a ROM firmware and a boot firmware of the computer system.

FIG. 2 is a flow chart for explaining processes of the ROM firmware 21 and the boot firmware 241 of the computer system 1.

When a fault is generated during the operation of the OS 243 and the panic or hang of the computer system 1 occurs, a stand-alone dump instruction is made with respect to the system monitoring mechanism 12 to issue a reset request. The system monitoring mechanism 12 is formed by a hardware that is operated by a processor independent of the main body 11, and carries out processes such as a power supply control, a fan monitoring and a reset process of the computer system 1. When the system monitoring mechanism 12 receives the stand-alone dump instruction, the system monitoring mechanism 12 sets an SADUMP specifying flag within system control variables stored therein, and resets the main body 11. First, when the main body 11 is reset, a step S1 shown in FIG. 1 boots the ROM firmware 21, and a step S2 executes hardware diagnosis (including memory diagnosis) and initialing. In this state, the SADUMP specifying flag is acquired from the system monitoring mechanism 12 and a step S3 decides whether or not the SADUMP specifying flag is ON. If the SADUMP specifying flag is ON and the decision result in the step S3 is YES, a step S4 does not execute a memory diagnosis, and the process advances to a step S6, and the control is transferred to the boot firmware 241 in a state where the memory data is saved. On the other hand, if the SADUMP specifying flag is OFF and the decision result in the step S3 is NO, a step S5 executes a memory diagnosis, and the process advances to the step S6. The boot firmware 241 carries out an initializing process with respect to the various drivers for the boot process, and carries out a probing process with respect to the HDDs 2-1, 2-2, 2-3, . . . that are connected to the computer system 1 in the step S6, and decides whether or not the SADUMP specifying flag is ON in a step S7. In this state, the value of the SADUMP specifying flag may be acquired from the system monitoring mechanism 12 or from the ROM firmware 21. If the SADUMP specifying flag is ON and the decision result in the step S8 is YES, the control is transferred to a boot process of the SADUMP loader which will be described later in conjunction with FIG. 3. On the other hand, if the SADUMP specifying flag is OFF and the decision result in the step S8 is NO, the control is transferred to a boot process of the OS loader 242 that includes a step S9 and the subsequent steps.

Next, a description will be given of the boot process of the OS loader 242. First, in the boot process of the OS loader 242, a step S9 checks the existence of the FjSdBootNext variable, and deletes the FjSdBootNext variable if it exists. A step S10 checks whether a remote boot is instructed from the system monitoring mechanism 12, and executes a process of the instructed remote boot if the remote boot is instructed. Since the remote boot instructed from the system monitoring mechanism 12 is not directly related to the subject matter of the present invention, a detailed description thereof will be omitted in this specification.

Next, a step S11 determines a variable that is to be the actual booting target, from the plurality of BootXXXX variables existing within the NVRAM 23. The step S11 normally determines the variable according to the order set by the BootOrder variable, but when the remote boot is instructed from the system monitoring mechanism 12, the variable may be determined regardless of the BootOrder variable. In either case, the boot firmware 241 sets the value of the XXXX portion of the BootXXXX variable that is determined as the booting target to a BootCurrent variable which is a memory variable. This BootCurrent variable is managed by the boot firmware 241, but is not an NVRAM variable. Hence, this BootCurrent variable is lost when the power of the computer system 1 is turned OFF. By checking the BootCurrent variable after booting the OS 243, it becomes possible to judge which booting apparatus has been booted in the OS 243.

Next, the boot firmware 241 decides whether or not the selected booting target apparatus is other than the CDROM/DVDROM drive 3 and a network boot (PXE), in a step S12. If the selected booting target apparatus is the CDROM/DVDROM drive 3 or the PXE and the decision result in the step S12 is NO, a step S17 immediately loads and boots the OS loader 242 according to the selected BootXXXX variable. A step S18 boots the OS 242, and the process ends. On the other hand, if the selected booting target apparatus is other than the CDROM/DVDROM drive 3 and the PXE and the decision result in the step S12 is YES, a step S13 decides whether or not a FjSdBtTbl table variable exists in the NVRAM variables. If the FjSdBtTbl variable does not exist and the decision result in the step S13 is NO, the step S17 immediately loads and boots the OS loader 242 according to the selected BootXXXX variable. But if the FjSdBtTbl variable exists and the decision result in the step S13 is YES, a step S14 searches for the FjSdBtTbl variable using the value of the XXXX portion of the selected BootXXXX variable as a key. A search process of this step S14 will be described later in the specification. A step S15 decides whether or not an entry corresponding to the key exists, as a result of the search process carried out in the step S14. If the decision result in the step S15 is NO, the step S17 immediately loads and boots the OS loader 242 according to the selected BootXXXX variable. On the other hand, if the decision result in the step S15 is YES, a step S16 obtains the value of the YYYY portion of the FjSdBootYYYY variable from the corresponding entry to create the FjSdBootNext variable, and sets the obtained value of the YYYY portion to the FjSdBootNext variable. After the step S16, the process advances to the step S17 which loads and boots the OS loader 242 according to the selected BootXXXX variable.

Figure 3:
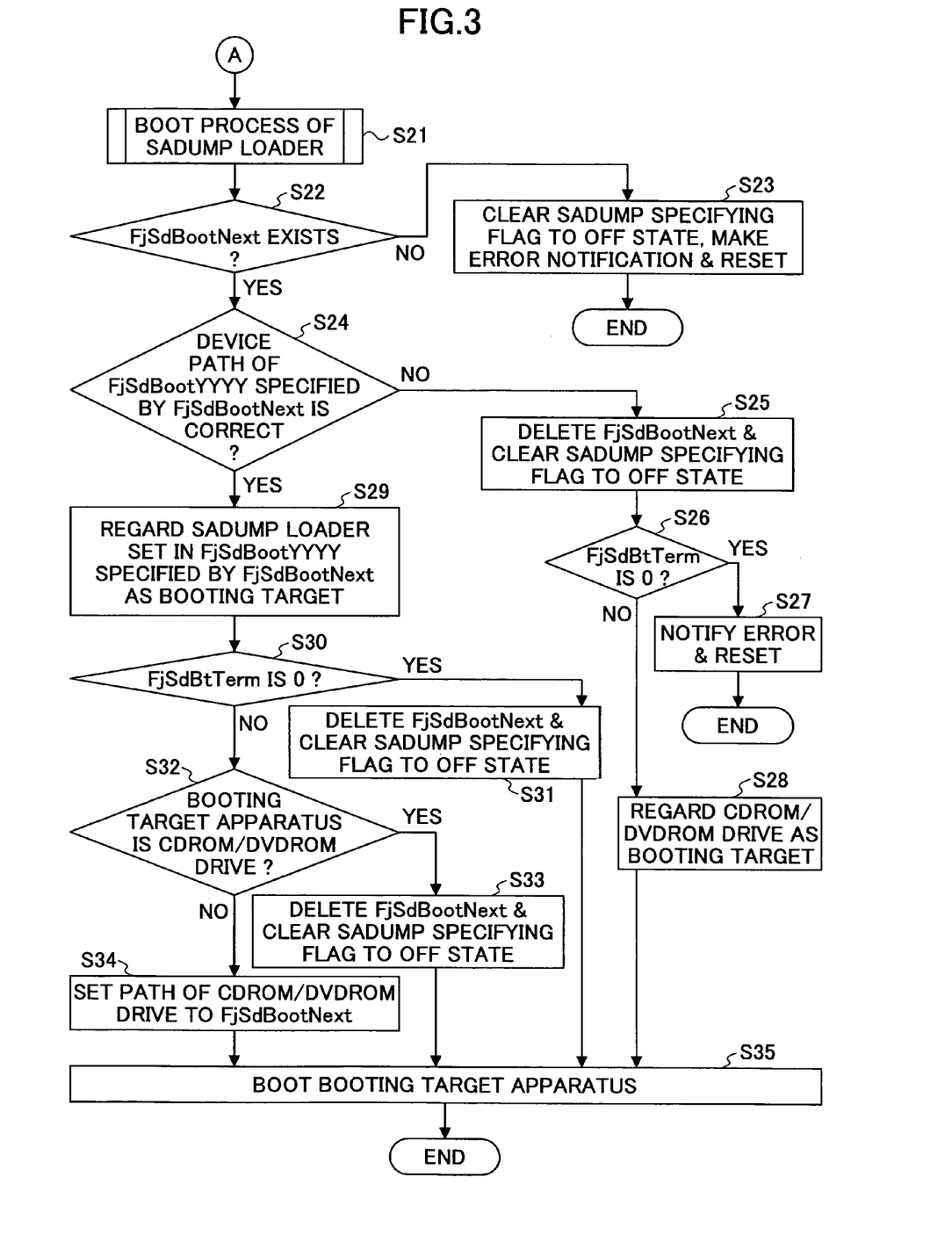
FIG. 3 is a flow chart for explaining a boot process of an SADUMP loader.

Next, a description will be given of the boot process of the SADUMP loader, by referring to FIG. 3. FIG. 3 is a flow chart for explaining the boot process of the SADUMP loader.

In FIG. 3, when the boot process of the SADUMP loader is started in a step S21, a step S22 first decides whether or not the FjSdBootNext variable exists. If no FjSdBootNext variable exists and the decision result in the step S22 is NO, a step S23 clears the SADUMP specifying flag to an OFF state in the system monitoring mechanism 12, resets the computer system 1 after making an error notification, and the process ends. On the other hand, if the FjSdBootNext variable exists and the decision result in the step S22 is YES, a step S24 interprets the data of the FjSdBootYYYY variable that is specified by the FjSdBootNext variable, and decides whether or not the device path information of the FjSdBootYYYY variable is correct. In other words, the step S24 checks the device information and the SADUMP loader information that are set in the boot information, and decides whether or not there is a match with those of the apparatuses connected to the computer system 1. If the decision result in the step S24 is NO, a step S25 deletes this FjSdBootNext variable, and clears the SADUMP specifying flag to the OFF state in the system monitoring mechanism 12. Thereafter a step S26 checks a FjSdBtTerm variable which is an NVRAM variable for use by an error process. More particularly, the step S26 decides whether or not the value of the FjSdBtTerm variable is "0". If the decision result in the step S26 is YES, a step S27 resets the computer system 1 after making an error notification, and the process ends. On the other hand, if the value of the FjSdBtTerm variable is other than "o" and the decision result in the step S26 is NO, a step S28 regards the CDROM/DVDROM drive 3 as the booting target apparatus, a step S35 carries out the boot process with respect to this booting target apparatus, and the process ends.

If the result of interpreting the data of the FjSdBootYYYY variable indicates a match with the apparatus connected to the computer system 1 and the decision result in the step S24 is YES, a step S29 regards as the booting target the SADUMP loader that is set in the FjSdBootYYYY variable specified by the FjSdBootNext variable. In this state, before actually carrying out the boot process, a step S30 checks the FjSdBtTerm variable. In other words, the step S30 decides whether or not the value of the FjSdBtTerm variable is "0". If the decision result in the step S30 is YES, the process does not advance to the retry from the CDROM/DVDROM drive 3 even when an error is generated thereafter. Thus, a step S31 deletes the FjSdBootNext variable and clears the SADUMP specifying flag to the OFF state, the step S35 carries out the boot process with respect to the booting target apparatus, and the process ends.

If the FjSdBtTerm variable is other than "0" and the decision result in the step S30 is NO, there is a possibility of executing a retry from the CDROM/DVDROM drive 3. For this reason, a step S32 first decides whether or not the present booting target apparatus is already the CDROM/DVDROM drive 3, based on the device information of the FjSdBootYYYY variable. If the present booting target apparatus is the CDROM/DVDROM drive 3 and the decision result in the step S32 is YES, no further retry will be made from the CDROM/DVDROM drive 3 even when an error end occurs. Hence, a step S33 deletes the FjSdBootNext variable, and clears the SADUMP specifying flag to the OFF state in the system monitoring mechanism 12. Thereafter, the step S35 carries out the boot process with respect to the booting target apparatus, and the process ends. On the other hand, if the present booting target apparatus is not the CDROM/DVDROM drive 3 and the decision result in the step S32 is NO, a step S34 sets the information of the CDROM/DVDROM drive 3 in the FjSdBootNext variable so that the retry can next be made from the CDROM/DVDROM drive 3 when the error end occurs, and thereafter, the step S35 carries out the boot process with respect to this booting target apparatus, and the process ends.

Next, a description will be given of the specifications of the FjSdBtTbl table variable. The FjSdBtTbl table variable is made up of an array of elements that are formed by structures having a 2-byte OsBootNum variable and a 2-byte SdBootNum variable as members. The 2-byte OsBootNum variable has the value of the XXXX portion of the BootXXXX variable that is a boot option variable specifying the booting target apparatus of the OS loader 242. The 2-byte SdBootNum variable has the value of the YYYY portion of the FjSdBootYYYY variable that is a boot option variable specifying the booting target apparatus of the SADUMP loader.

```
typedef struct __FJSV_SD_BT_TBL_ENTRY {
    UNIT16  OsBootNum;          //Value
corresponding to XXXX portion of BootXXXX
    UNIT16  SdBootNum;          //Value
corresponding to YYYY portion of FjSdBootYYYY
} FJSV_SD_BT_TBL_ENTRY;
```

In this embodiment, it is assumed for the sake of convenience that the entry data of the SADUMP loader corresponding to the OS loader 242 is preset in the FjSdBtTbl table variable. This setting of the FjSdBtTbl table variable may be made by the SADUMP installer 244 according to the following rules.

(1) It is assumed for the same of convenience that the FjSdBtTbl table variable is made up solely of the entries each corresponding to the boot option BootXXXX (BootXXXX variable) of the OS 243 that is supported by the SADUMP installed in the computer system 1. The OS 243 supported by the SADUMP is such that, when a fault is generated during the operation of this OS 243, this OS 243 can execute a memory dump for inspecting the fault by booting the SADUMP. For example, in a case where a plurality of OSs 243 are bootable in the computer system 1 but the installed SADUMP only supports some of the OSs 243, the FjSdBtTbl table variable is made up solely of the entries corresponding to the boot options BootXXXX of the supported OSs 243. In addition, even if the SADUMP supports the OS 243, the SADUMP is not booted when a fault is generated during the operation of this OS 243 if the entries of the FjSdBtTbl table variable do not include an entry corresponding to the boot option BootXXXX of this OS 243.

(2) The value of the OsBootNum variable is set so that the OsBootNum variable takes a smaller value for smaller entry of the FjSdBtTbl table variable.

(3) A single SADUMP can support a plurality of OSs 243. Hence, the SdBootNum variable may have the same value for different entries.

(4) A plurality of SADUMPs can be installed in the computer system 1. However, it is necessary to uniquely determine the installed SADUMPs to which the plurality of OSs 243 are to correspond, respectively.

(5) The FjSdBtTbl table variable is created by the SADUMP installer 244 when installing the SADUMP, by determining the corresponding relationship to the OS 243 that is bootable in the computer system 1. In addition, when uninstalling the SADUMP, all of the entries having the loader number (value) of the SADUMP that is uninstalled by the SADUMP uninstaller 245 are deleted. Further, by booting the SADUMP installer 244 when newly installing or uninstalling the OS 243 after installing the SADUMP, it is possible to perform maintenance by adding a new entry by determining the corresponding relationship of the new OS 243 and the SADUMP or, deleting the entry having the boot option number (value) of the uninstalled OS 243.

Next, a description will be given of a process of acquiring the booting target apparatus of the SADUMP loader corresponding to the booting target apparatus of the OS loader 242, by utilizing the FjSdBtTbl table variable.

When booting the OS 243, the boot option BootXXXX of the booting target is selected from the plurality of existing boot options. But in order to preset the SADUMP that is installed in the computer system 1 and is to be booted when a fault is generated during the operation of the computer system 1 by the selected OS 243, the FjSdBootNext variable is created, and the value of the YYYY portion of the boot option FjSdBootYYYY of the SADUMP that is booted is set. The FjSdBtTbl table variable is used to find out the boot option FjSdBootYYYY to which the boot option BootXXXX of the selected OS 243 corresponds. That is, the value of the XXXX portion of the boot option BootXXXX of the selected booting target and the value of the OsBootNum variable of the FjSdBtTbl table variable are successively compared starting from the smaller entries towards the larger entries. If all of the existing entries are compared but none match, the FjSdBootNext variable is not created, and the OS 243 according to the boot option BootXXXX is booted. In this case, since the OS 243 that is booted does not have a corresponding SADUMP, no SADUMP is carried out. On the other hand, if matching entries exist as a result of the comparison, the FjSdBootNext variable is created, and the value in the SdBootNum variable of the matching entry is set as the value of the FjSdBootNext variable.

Figure 4:
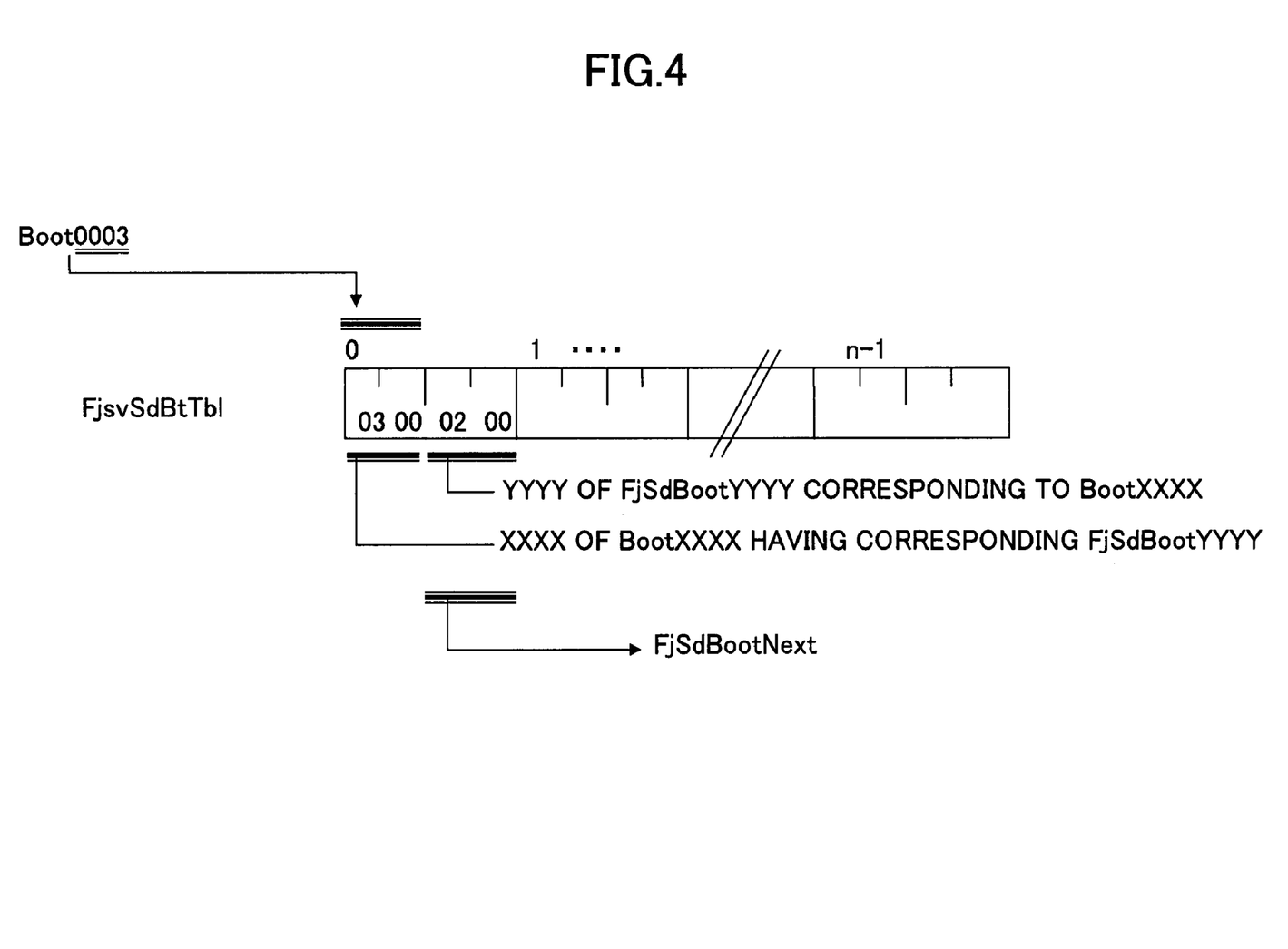
FIG. 4 is a diagram for explaining a process of determining a FjSdBootYYYY variable corresponding to a BootXXXX variable by using a FjSdBtTbl table variable.

FIG. 4 is a diagram for explaining a process of determining the FjSdBootYYYY variable corresponding to the BootXXXX variable by using the FjSdBtTbl table variable. FIG. 4 shows a case where the FjSdBoot0002 variable corresponds to the Boot0003 variable.

In the normal boot process of OS loader 242, the BootXXXX variable of the booting target is determined from the boot variables (or NVRAM variables) such as the BootOrder variable and the BootNext variable. The value of the XXXX portion of the Boot variable BootXXXX that is determined is set in the BootCurrent variable (memory variable). But in addition, the value of the XXXX portion is used as a key to search the FjSdBtTbl table variable, and the FjSdNext variable, which is an NVRAM variable, is created if the entry corresponding to the key exists. The value of the YYYY portion of the FjSdBootYYYY variable is obtained from the entry corresponding to the key, and this value is set in the FjSdBootNext variable. If no entry corresponding to the key exists, the FjSdNext variable, which is an NVRAM variable, is deleted. Thereafter, the OS loader 242 is booted from the booting target apparatus set in the Boot0003 variable.

Next, a description will be given of the specifications of the FjSdBootYYYY variable. For example, the specifications of the FjSdBootYYYY variable are as follows, where Attributes variable, FilePathListLength variable, FilePath-List variable and OptionalData variable are defined as follows.

```
typedef struct __FJSV_SD_BOOT {
    UNIT32    Attributes ;
    UNIT16    FilePathListLength ;
    CHAR16    Decription[ ] ;
    DEVICE_PATH              FilePathList[ ] :
    UNIT8                    OptionalData[ ] ;
}FJ_SD_BOOT ;
```

1) Attributes: Information specifying an additional process when loading the SADUMP.

2) FilePathListLength: Information indicating a byte size of the FilePathList variable.

3) Description: Information for inserting a description of the boot option of the SADUMP, and formed by a unicode character string ending with a NULL character.

4) FilePathList: Device path information specifying the location of the SADUMP loader for booting the target SADUMP.

5) OptionalData: Data to be transferred to the SADUMP loader.

Figure 5:
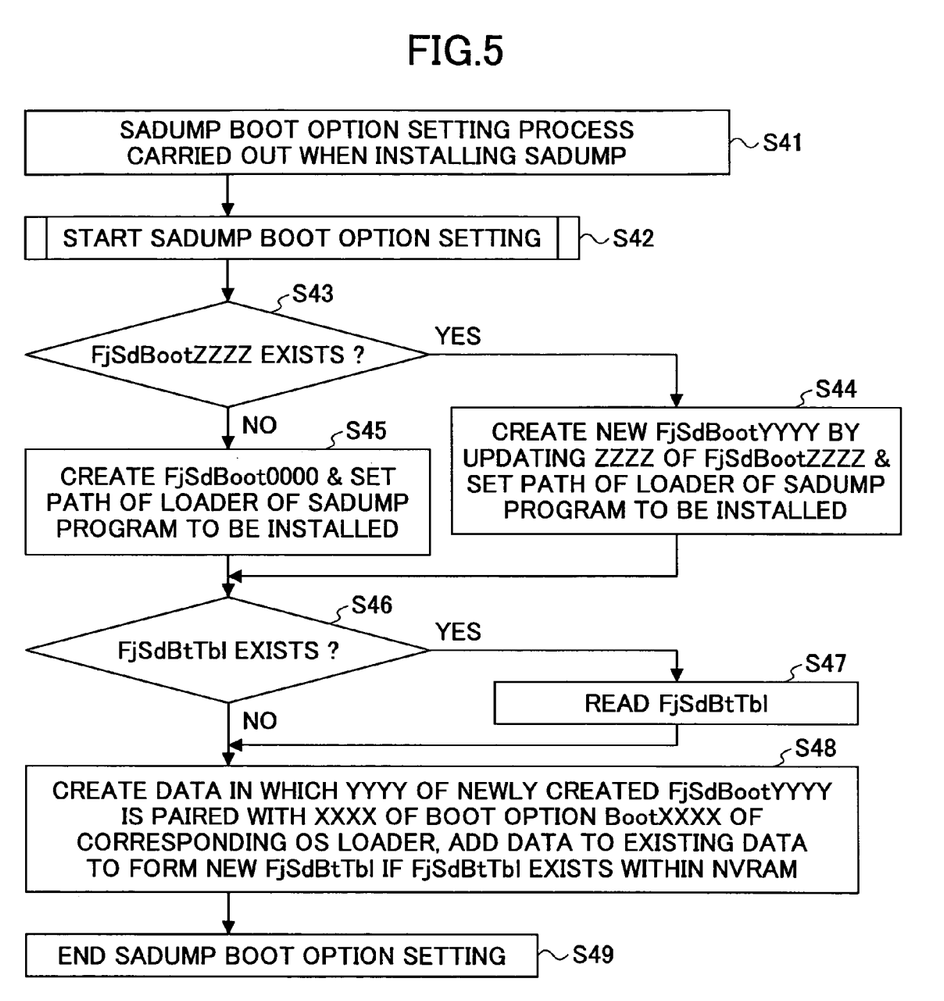
FIG. 5 is a flow chart for explaining a process carried out by an SADUMP installer with respect to an NVRAM variable.

FIG. 5 is a flow chart for explaining a process carried out by the SADUMP installer 244 with respect to the NVRAM variable.

In FIG. 5, when an SADUMP boot option setting process that is carried out when installing the SADUMP is started in a step S41, a step S42 starts the boot option setting of the SADUMP, and a step S43 decides whether or not a FjSd-BootZZZZ variable exists within the NVRAM 23. If the decision result in the step S43 is YES, a step S44 creates a new FjSdBootYYYY variable by updating the value of a ZZZZ portion of the FjSdBootZZZZ variable, and sets the device path information of the SADUMP loader of the SADUMP that is to be installed. On the other hand, if the decision result in the step S43 is NO, a step S45 creates a FjSdBoot0000 variable, and sets the device path information of the SADUMP loader of the SADUMP that is to be installed.

After the step S44 or S45, a step S46 decides whether or not the FjSdBtTbl table variable exists within the NVRAM 23. If the decision result in the step S46 is YES, a step S47 reads the FjSdBtTbl table variable from the NVRAM 23. If the decision result in the step S46 is NO or, after the step S47, a step S48 creates data in which value of the YYYY portion of the newly created FjSdBootYYYY variable is paired with the XXXX portion of the boot option BootXXXX (BootXXXX variable) of the corresponding OS loader 242, and if the FjSdBtTbl table variable exists within the NVRAM 23, the data is added to the existing data to form the new FjSdBtTbl table variable. In addition, a step S49 ends the boot option setting of the SADUMP.

Figure 6:
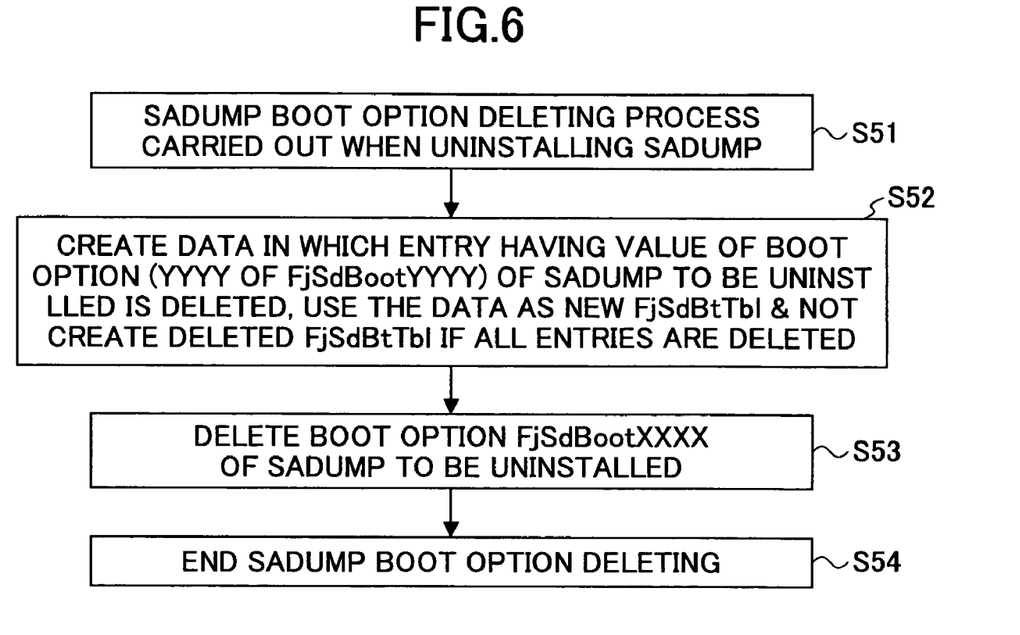
FIG. 6 is a flow chart for explaining a process carried out by an SADUMP uninstaller with respect to the NVRAM variable.

FIG. 6 is a flow chart for explaining a process carried out by the SADUMP uninstaller 245 with respect to the NVRAM variable.

In FIG. 6, when an SADUMP boot option deleting process that is carried out when uninstalling the SADUMP is started in a step S51, a step S52 reads the FjSdBtTbl table variable from the NVRAM 23. In addition, the step S52 creates data in which the entry having the value of the boot option (the YYYY portion of the FjSdBootYYYY variable) of the SADUMP that is to be uninstalled is deleted, and uses the data as the new FjSdBtTbl table variable. If all of the entries are deleted, the step S52 does not create the deleted FjSdBtTbl table variable. A step S53 deletes the FjSdBootYYYY variable which is the boot option of the SADUMP that is to be uninstalled. A step S54 ends the boot option deleting of the SADUMP.

Therefore, the present invention is applied to a computer system in which a plurality of OSs are bootable, and when booting the OS, the OS can be switched and operated by selecting the booting target apparatus automatically or manually from a plurality of booting target apparatuses. A stand-alone dump program that resets and starts the computer system when a fault is generated during the operation of the OS may be set to a program that supports an optimum memory dump for the OS that was operating immediately before the fault was generated.

This application claims the benefit of a Japanese Patent Application No. 2005-018287 filed Jan. 26, 2005, in the Japanese Patent Office, the disclosure of which is hereby incorporated by reference.

Further, the present invention is not limited to these embodiments, but various variations and modifications may be made without departing from the scope of the present invention.

What is claimed is:

1. A memory dump program boot method comprising:
   (a) defining, in non-volatile variables that are managed by a boot firmware of a computer system, boot information of a plurality of stand-alone dump programs that are installed in the computer system, and a table variable indicating a corresponding relationship of the plurality of stand-alone dump programs and a plurality of operating systems;
   (b) specifying the boot information of a corresponding one of the plurality of stand-alone dump programs from the table variables when the boot firmware boots an arbitrary one of the plurality of operating systems, and writing information indicating the specified boot information in the non-volatile variables that are referred to when executing a stand-alone dump; and
   (c) booting the corresponding one of the plurality of stand-alone dump programs when a booting of the stand-alone dump is instructed, by checking existence of variables that are referred to when executing the stand-alone dump and referring to information of the variables if the variables exist.

2. The memory dump program boot method as claimed in claim 1, wherein no variables to be referred to when executing the stand-alone dump is created if the arbitrary one of the plurality of operating systems to be booted has no corresponding stand-alone dump program.

3. The memory dump program boot method as claimed in claim 1, wherein:
the boot information includes first, second, third, fourth and fifth variables;
the first variable includes device path information that indicates a location in the computer system where a booting target apparatus is connected, and information related to a file position and a file name of an operating system loader program;
the second variable indicates an order in which a plurality of existing booting target apparatuses indicated by the first variable are to be booted;
the third variable includes device path information of a booting target apparatus that stores a loader program of the stand-alone dump program, and information related to a file position and a file name of the loader program of the stand-alone dump program;
the fourth variable holds the third variable which is the boot information of the loader program of the stand-alone dump program that is to be booted next; and
the fifth variable specifies a process to be carried out when an error end of the stand-alone dump occurs.

4. The memory dump program boot method as claimed in claim 3, wherein:
the booting target apparatus includes a hard disk drive and/or a CDROM drive and/or a DVDROM drive; and
the fifth variable is specifies making an error notification and rebooting the arbitrary one of the plurality of operating systems or, specifies booting of the stand-alone dump program that is stored in the CDROM drive or the DVDROM drive forming the booting target apparatus.

5. The memory dump program boot method as claimed in claim 1, wherein an image of a loader program of the stand-alone dump program and an image of the stand-alone dump program are stored at a storage location independent of a storage location within the booting target apparatus that is coupled to the computer system and stores an image of a loader program of the operating system and an image of the operating system.

6. The memory dump program boot method as claimed in claim 1, further comprising:
(d) managing a flag indicating whether or not to carry out a memory diagnosis by a system monitoring mechanism which operates by a hardware that is independent of a main body of the computer system.

7. A memory dump program boot apparatus comprising:
a non-volatile memory configured to store, in non-volatile variables that are managed by a boot firmware of a computer system, boot information of a plurality of stand-alone dump programs that are installed in the computer system, and a table variable indicating a corresponding relationship of the plurality of stand-alone dump programs and a plurality of operating systems;
a write part configured to specify the boot information of a corresponding one of the plurality of stand-alone dump programs from the table variables when the boot firmware boots an arbitrary one of the plurality of operating systems, and to write information indicating the specified boot information in the non-volatile variables that are referred to when executing a stand-alone dump; and
a boot part configured to boot the corresponding one of the plurality of stand-alone dump programs when a booting of the stand-alone dump is instructed, by checking existence of variables that are referred to when executing the stand-alone dump and referring to information of the variables if the variables exist.

8. The memory dump program boot apparatus as claimed in claim 7, wherein no variables to be referred to when executing the stand-alone dump is created if the arbitrary one of the plurality of operating systems to be booted has no corresponding stand-alone dump program.

9. The memory dump program boot apparatus as claimed in claim 7, wherein:
the boot information includes first, second, third, fourth and fifth variables;
the first variable includes device path information that indicates a location in the computer system where a booting target apparatus is connected, and information related to a file position and a file name of an operating system loader program;
the second variable indicates an order in which a plurality of existing booting target apparatuses indicated by the first variable are to be booted;
the third variable includes device path information of a booting target apparatus that stores a loader program of the stand-alone dump program, and information related to a file position and a file name of the loader program of the stand-alone dump program;
the fourth variable holds the third variable which is the boot information of the loader program of the stand-alone dump program that is to be booted next; and
the fifth variable specifies a process to be carried out when an error end of the stand-alone dump occurs.

10. The memory dump program boot apparatus as claimed in claim 9, wherein:
the booting target apparatus includes a hard disk drive and/or a CDROM drive and/or a DVDROM drive; and
the fifth variable is specifies making an error notification and rebooting the arbitrary one of the plurality of operating systems or, specifies booting of the stand-alone dump program that is stored in the CDROM drive or the DVDROM drive forming the booting target apparatus.

11. The memory dump program boot apparatus as claimed in claim 7, wherein an image of a loader program of the stand-alone dump program and an image of the stand-alone dump program are stored at a storage location independent of a storage location within the booting target apparatus that is coupled to the computer system and stores an image of a loader program of the operating system and an image of the operating system.

12. The memory dump program boot apparatus as claimed in claim 7, further comprising:
a system monitoring mechanism configured to manage a flag indicating whether or not to carry out a memory diagnosis by operating with a hardware that is independent of a main body of the computer system.

13. A computer-readable storage medium which stores a program for causing a computer of a computer system to boot a memory dump program, said program comprising:
a procedure causing the computer to define, in non-volatile variables that are managed by a boot firmware of a computer system, boot information of a plurality of stand-alone dump programs that are installed in the computer system, and a table variable indicating a corresponding relationship of the plurality of stand-alone dump programs and a plurality of operating systems;
a procedure causing the computer to specify the boot information of a corresponding one of the plurality of stand-alone dump programs from the table variables when the boot firmware boots an arbitrary one of the plurality of operating systems, and to write information indicating the specified boot information in the non-volatile variables that are referred to when executing a stand-alone dump; and a procedure causing the computer to boot the corresponding one of the plurality of stand-alone dump programs when a booting of the stand-alone dump is instructed, by checking existence of variables that are referred to when executing the stand-alone dump and referring to information of the variables if the variables exist.

14. The computer-readable storage medium as claimed in claim 13, wherein no variables to be referred to when executing the stand-alone dump is created if the arbitrary one of the plurality of operating systems to be booted has no corresponding stand-alone dump program.

15. The computer-readable storage medium as claimed in claim 13, wherein:
the boot information includes first, second, third, fourth and fifth variables;
the first variable includes device path information that indicates a location in the computer system where a booting target apparatus is connected, and information related to a file position and a file name of an operating system loader program;
the second variable indicates an order in which a plurality of existing booting target apparatuses indicated by the first variable are to be booted;
the third variable includes device path information of a booting target apparatus that stores a loader program of the stand-alone dump program, and information related to a file position and a file name of the loader program of the stand-alone dump program;
the fourth variable holds the third variable which is the boot information of the loader program of the stand-alone dump program that is to be booted next; and
the fifth variable specifies a process to be carried out when an error end of the stand-alone dump occurs.

16. The computer-readable storage medium as claimed in claim 15, wherein:
the booting target apparatus includes a hard disk drive and/or a CDROM drive and/or a DVDROM drive; and
the fifth variable is specifies making an error notification and rebooting the arbitrary one of the plurality of operating systems or, specifies booting of the stand-alone dump program that is stored in the CDROM drive or the DVDROM drive forming the booting target apparatus.

17. The computer-readable storage medium as claimed in claim 13, wherein an image of a loader program of the stand-alone dump program and an image of the stand-alone dump program are stored at a storage location independent of a storage location within the booting target apparatus that is coupled to the computer system and stores an image of a loader program of the operating system and an image of the operating system.

18. The computer-readable storage medium as claimed in claim 13, said program further comprising:
a procedure causing the computer to manage a flag indicating whether or not to carry out a memory diagnosis by a system monitoring mechanism which operates by a hardware that is independent of a main body of the computer system.

* * * * *

UNITED STATES PATENT AND TRADEMARK OFFICE
CERTIFICATE OF CORRECTION

PATENT NO.         : 7,302,559 B2
APPLICATION NO. : 11/118333
DATED                  : November 27, 2007
INVENTOR(S)        : Yukio Oguma It is certified that error appears in the above-identified patent and that said Letters Patent is hereby corrected as shown below:

Title Page item 56, Column 2 (Other Publications), Line 1, change "Kawaski" to --Kawasaki--.

Signed and Sealed this

Third Day of June, 2008

JON W. DUDAS
*Director of the United States Patent and Trademark Office*